Sept. 16, 1952 J. H. L' ABÉE-LUND 2,610,410
MOTION TRANSMITTING MECHANISM
Filed Nov. 5, 1948 3 Sheets-Sheet 1
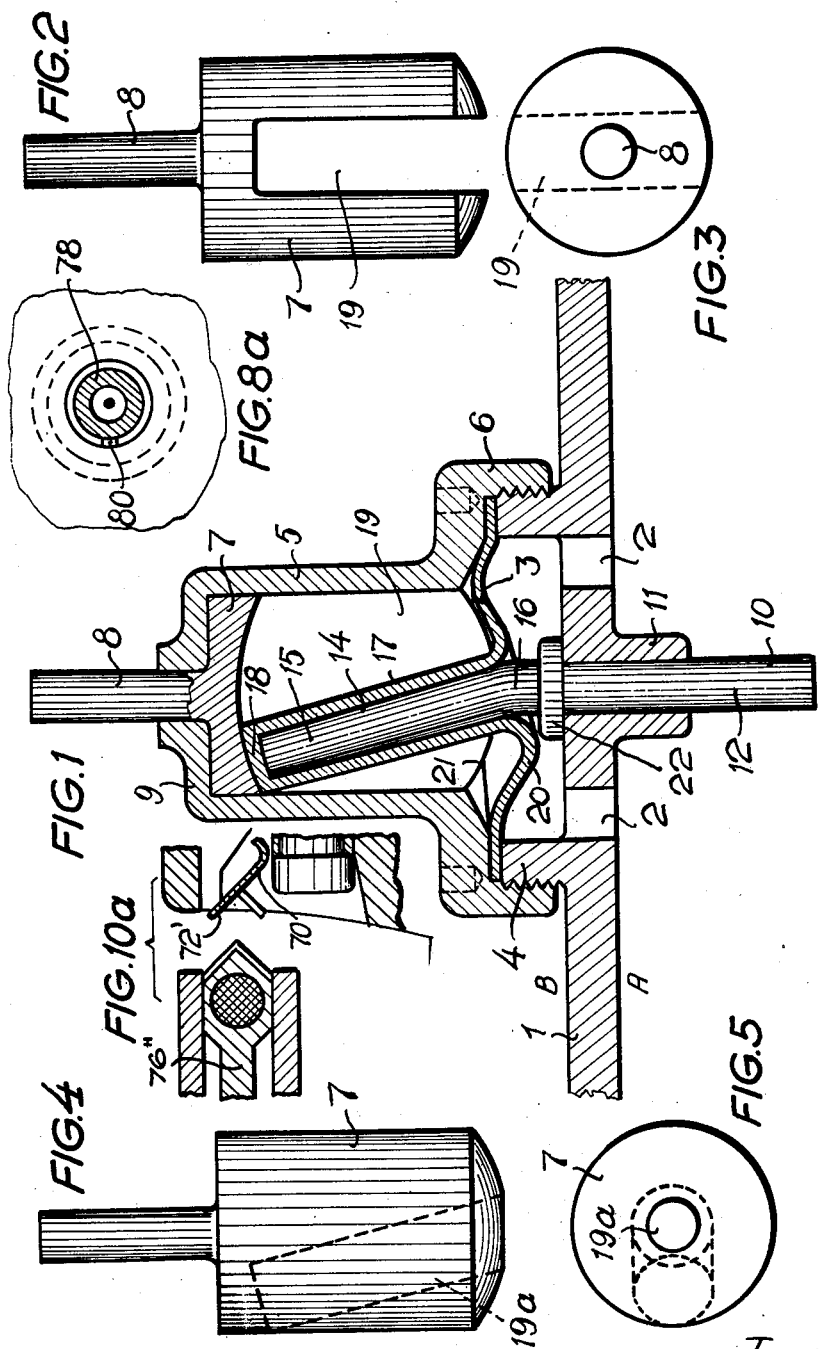
Inventor,
J. H. L'Abée-Lund
By Young, Emery & Thompson
Att'ys.

Sept. 16, 1952  J. H. L' ABÉE-LUND  2,610,410
MOTION TRANSMITTING MECHANISM
Filed Nov. 5, 1948  3 Sheets-Sheet 2
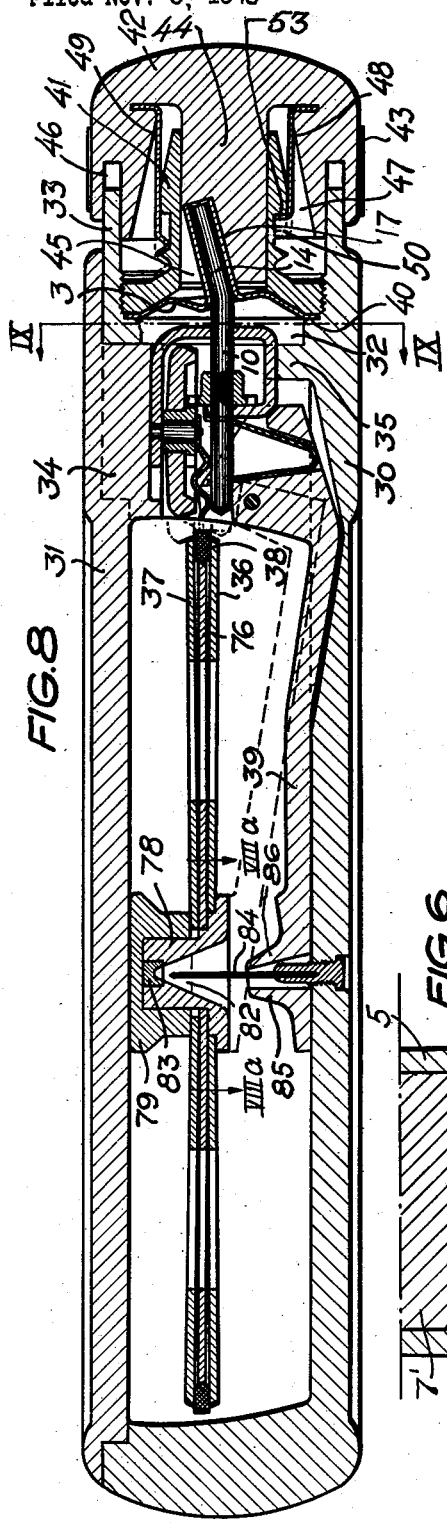
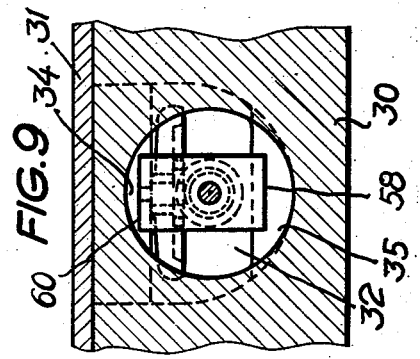
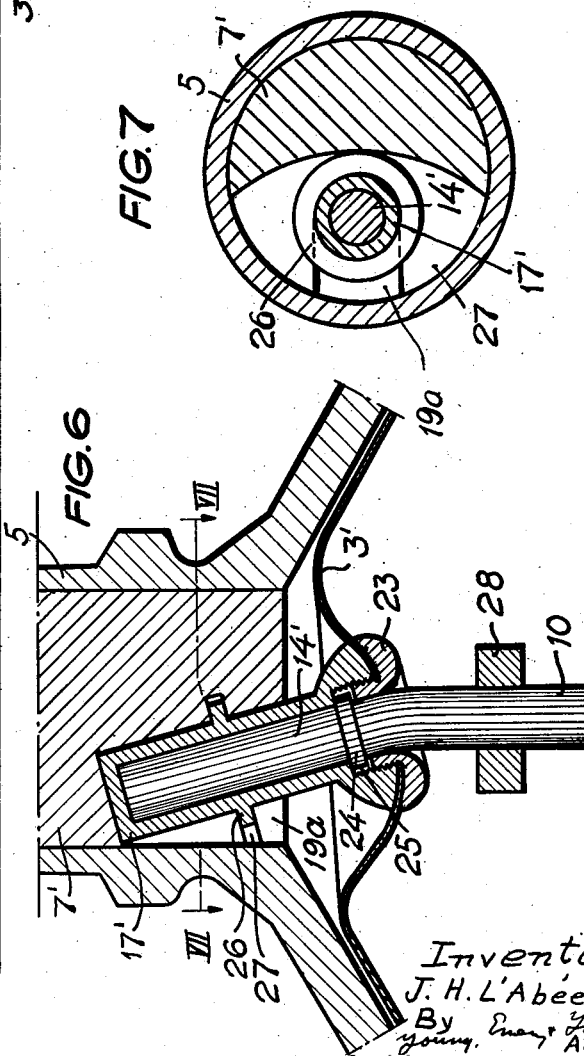
Inventor,
J. H. L'Abée-Lund
By Young, Emery & Thompson
Attys.

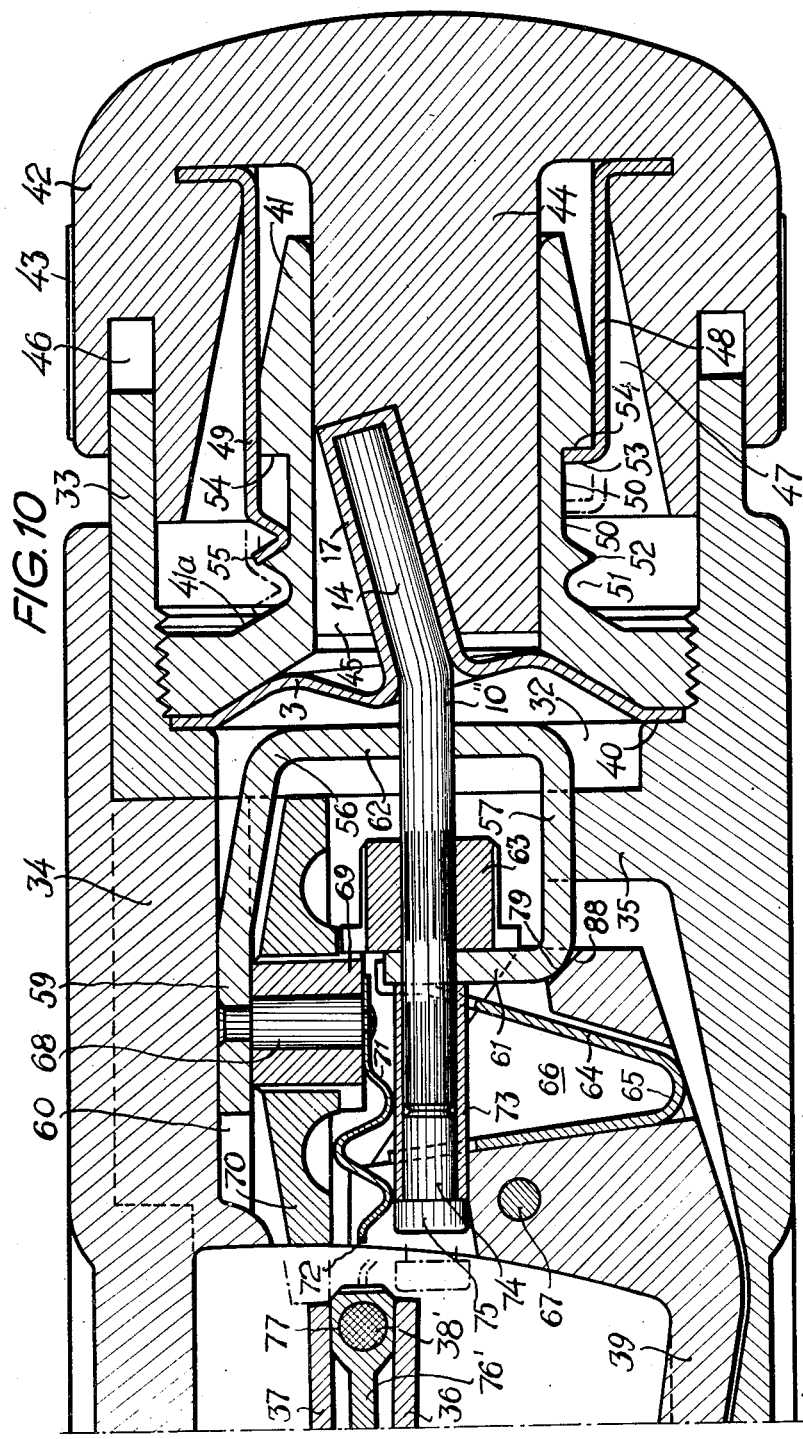

Patented Sept. 16, 1952

2,610,410

UNITED STATES PATENT OFFICE 2,610,410

MOTION TRANSMITTING MECHANISM

Johan Henrik L'Abée-Lund, Nordstrand, near Oslo, Norway, assignor to L'Abée-Lund A./S., Nordstrand, near Oslo, Norway, a corporation of Norway Application November 5, 1948, Serial No. 58,578
In Sweden November 30, 1946

4 Claims. (Cl. 33—223)

The present invention relates to mechanisms for transmitting motion through a pliable wall or diaphragm between members at opposite sides of the wall or diaphragm particularly rotary members which may also be imparted a translatory movement.

The primary object of the invention is to obtain a reliable and simple mechanism of the type referred to and by which motion and power may be transmitted through the pliable wall without direct contact between the member at the opposide side of the wall.

A further object of the invention is to obtain a motion transmitting mechanism, by which power and motion may be transmitted through a diaphragm hermetically separating two spaces such as the interior of a closed vessel and the outer atmosphere while maintaining the sealing quality of the diaphragm.

A further important object of the invention is to provide a compass adjusting device by which elements in the interior of a closed compass housing such as a marching direction pointer or the compass rose or card may be set in position relatively to the magnetic system of the compass from the outer side of the compass through a diaphragm separating the interior of the housing from the outer atmosphere.

The invention will be better understood by the following description taken in connection with the accompanying drawings, the scope of the invention being defined by the claims. In the drawings Fig. 1 is an axial sectional view of a motion transmitting mechanism according to one simple embodiment of the invention, Fig. 2 is a side elevation of one of the rotary members in the embodiment shown in Fig. 1, and Fig. 3 is a corresponding bottom view, Figs. 4 and 5 are views similar to those shown in Figs. 2 and 3 but showing a modified form of one of the rotary members, Fig. 6 is an axial sectional view of a motion transmitting mechanism according to a second simple embodiment of the invention, Fig. 7 is a transverse sectional view on the broken line VII—VII in Fig. 6, Fig. 8 is a central sectional view of a liquid compass equipped with a motion transmitting mechanism according to a third embodiment of the invention, Fig. 8a is a transverse section on line VIIIa—VIIIa in Fig. 8, showing a detail included in said compass, Fig. 9 is a partial sectional view on line IX—IX in Fig. 8, and Fig. 10 is a central sectional view illustrating more in detail and on an enlarged scale the motion transmitting mechanism included in Fig. 8 slightly modified, and the adjacent portions of the compass, also slightly modified. Fig. 10a is a modification of a fragment of Fig. 10.

With reference to Figs. 1 to 3, a rigid wall 1 separating two spaces A and B, Fig. 1, at opposite sides thereof has openings 2, 2, over which a pliable wall or diaphragm 3 is mounted. The diaphragm or pliable wall may be made from rubber, plastic or sheet metal, particularly steel, and in case of rubber or plastic the material may be reinforced by fabric of glass or wire. The diaphragm 3 may be considered as a portion of the wall 1 or be secured thereto in a sealing fashion so that the spaces A, B are hermetically separated from one another. The latter alternative is shown, and the wall 1 has a socket 4 surrounding the openings 2, 2 and having the marginal portion of the diaphragm clamped over the mouth thereof by a journal casing 5. The casing 5 has a flange 6 with internal screw threads engaging external screw threads on the socket 4. The casing 5 forms a cylindrical cavity, and rotatably fitted therein is a rotary member 7 having a reduced portion or shaft 8 extending through the end wall 9 of the casing 5. In coaxial alignment with member 7 is a rotary shaft 10 journalled at the opposite side of the diaphragm 3 in a bearing 11 formed at the central portion of the rigid wall 1. The center line of the shaft 10 is disclosed in Fig. 1, the same being denoted by 12. The shaft 10 is abruptly curved at a distance from the end thereof, so that the same will have a straight end portion 14 forming an angle with the remainder of the shaft, which is also straight. The center line of the oblique end portion 14 is designated by 15, this center line intersecting the axis of rotation 12 at the point 16 at an angle of 10 to 30°, preferably at an angle of approximately 15°. The oblique shaft end 14, which forms a crank-arm, is closely embraced by a sheath or sleeve 17 having at the top thereof a closed bottom 18, while said sleeve merges downwardly into the pliable wall 3 and is integral therewith. The sleeve 17 closely surrounds the oblique shaft end as far as to the bend, the forming of the transition into the wall 3 being such that the annular region, where the wall commences to become pliable enough to be bent at the rotation of the shaft 10, is located at a plane which intersects the axis of rotation 12 at or adjacent to the point 16.

To render possible flexures of the wall or diaphragm 3 without any stretching of the material, the free marginal portions of the diaphragm have the approximate configuration of an upwardly convex spherical surface in Fig. 1, and at the central portions 20 of the walls the same is bulged inwardly so as to form a downwardly convex, approximately spherical surface. The diaphragm may have more or less deep annular undulations at the central portion, if desired, instead of the spherical bulges and the peripheral portion may be of any suitable form. At the rotation of the shaft 10, said inward bulge will waddle in a circular movement. The sleeve 17 and the diaphragm 3 may be made from any arbitrary elastic material but is preferably constituted by a thermoplastic material, which may be readily moulded to the desired shape in order then to be fused integral with the socket 4. At the rotation of the shaft, the shaft end or crank arm 14 rotates within the sleeve 17, the latter thus forming a kind of a bearing, and consequently the material should also be selected with respect to the least possible friction on the shaft. If desired, a suitable lubricant may be provided between the shaft and the sleeve.

The rotary member 7 has a diametrical slot 19 engaged by the crank arm 14 and the surrounding sleeve 17. Preferably the rotary member 7 has a rounded end surface 21 opposite the diaphragm 3. A flange 22 on shaft 10 bears on the central portion of the rigid wall 1 and thus prevents shaft 10 from being displaced in a direction away from member 7 and secures a constant engagement between the sleeve 17 and slot 19, and between arm 14 and sleeve 17.

In operation, rotary motion can be transmitted from shaft 8 and member 7 to shaft 10 or vice versa. When member 7 is rotated, the shaft end 14 will be carried along in the rotary movement as a crank arm while sleeve 17 slides on the walls of slot 19. During the rotation the center line 15 of the crank arm 14 moves along a cone having its apex at 16, and the inward bulge 20 will travel around the axis of shaft 10, the diaphragm being imparted a sort of waddling movement.

Since slot 19 extends diametrically through member 7, it is possible to change the position of crank arm 14 and sleeve 17 in the slot so that said arm and sleeve become located in the opposite half of the slot as compared with that shown in Fig. 1. This may be effected by removing the casing 5 together with member 7, mounting them again after turning member 7 180° relatively to shaft 10.

The slot 19 in member 7 may be replaced by a cylindrical bore 19a like that illustrated in Figs. 4 and 5, and it would be apparent that the inner diameter of that bore should correspond to the outer diameter of the sleeve 17 which should fit slidably in said bore. On rotation of member 7 the cylindrical wall of the bore slides in a rotary manner in engagement with the outer wall of the sleeve, and the crank arm 14 rotates in the interior of the sleeve in engagement with its inner wall surface.

In the embodiment heretofore described it is only a rotary motion that is transmitted from member 7 to shaft 10 or from the latter to the former, but it falls within the scope of the invention to provide a mechanism which is able to transmit also translatory or axial movements through a pliable wall. Figs. 6 and 7 illustrate a simple modification of sleeve 17 and diaphragm 3 embodying this possibility.

The modification shown in Figs. 6 and 7 deviates from the construction according to Figs. 1, 2 and 3, substantially in that the sleeve 17' is made in the form of a separate element which is clamped to the diaphragm 3' in a sealing fashion. The sleeve may thus consist of any other suitable material, preferably metal. Here, the shaft end 14' consequently projects through an aperture in the diaphragm 3'. The sleeve 17', which surrounds the whole of the oblique shaft end, is provided at the mouth thereof with a separate clamping ring 23 for the diaphragm 3', and this ring and the sleeve proper are formed so that the wall is clamped fast opposite the bend of the shaft, in a manner such that the innermost free portions of the diaphragm will be located as near as possible to the surface of the shaft, without the clamping surface becoming so small, however, as to render the retainment or the sealing effect unsatisfactory. The end of the sleeve may be enlarged and have an enlarged screw-threaded bore engaged by the screw-threaded hub of the ring 23. Furthermore, the sleeve 17' is here connected positively to the shaft end so as to render a mutual displacement impossible. To this end the shaft end has an annular flange 24 arranged thereon, said flange projecting with the requisite play into a corresponding annular groove 25 in the sleeve, which is formed between the sleeve proper and the sealing ring 23. The sleeve 17' is also secured externally against axial displacement relatively to the parts cooperating therewith. For this purpose it is provided with an outer annular flange 26 cooperating with a slot 27 in the member 7', said slot being perpendicular to the slot 19a. Consequently as formed in the member 7' to receive the sleeve 17', the shaft 10 which is journalled in a bearing 28 will participate in the axial displacement of the member 7' as said member is pulled outward or pushed inward in the surrounding casing 5, and vice versa the member 7' will partake in axial movements imparted to shaft 10.

When the shaft 10 is displaced in the axial direction, the magnitude of the inward bulge of the diaphragm will be increased or decreased, and it is apparent that such axial displacement may be effected while turning the member 7' or not.

The mechanism may be designed so that the axial displacement occurs against spring action in one direction, the spring being mounted so as to maintain the engagement between the sleeve and the slot in the rotary member by pressing the shaft and thereby the sleeve towards the member. In this connection means may also be provided to retain the member in the position to which it has been displaced against the action of the spring. A mechanism embodying these features is illustrated in connection with the compass shown in Figs. 8, 9 and 10. Fig. 10 is slightly modified from that of Fig. 8 by including a somewhat different structure of the parts which contact the pointer disc of the compass. A slightly modified form of rim of the magnetic compass element is also shown in this figure. This mechanism may preferably be employed in cases where motion shall be transmitted to the interior of a closed vessel containing a liquid such as certain types of compass housings.

With reference to Figs. 8–10 the compass housing is designated with 30 and the cover with 31. Both the housing 30 and the cover may be made from transparent material, and the cover is hermetically sealed to the housing. The housing 30 is formed with a lateral passage 32, the outer portion of which is surrounded by a socket 33. The inner portion of the passage 32 is confined at the top by a projection 34 extending downward from the cover 31, and projecting from the bottom of the passage 32 is a bridge 35 for the purpose set forth hereinafter.

The passage 32 encloses a motion transmitting mechanism, which, in this embodiment, has for its object to enable adjustment and operation of the elements of the oscillatory unit in the interior of the compass such as adjustment of a compass card 36 or a marching-direction pointer disk 37 relatively to the magnetic element or ring 38′ or the operation of a locking lever 39 for the entire oscillatory unit of the compass.

The motion transmitting mechanism illustrated in Figs. 8–10 comprises a diaphragm 3 with a sleeve 17 of the same type as that specified with reference to Fig. 1, but it is evident that diaphragm and sleeve may be formed as shown in Figs. 6–7 also in connection with the embodiment now to be described. The shaft indicated at 10′ in Fig. 8 and 10″ in Fig. 10 and its oblique end portion 14 may be formed as in Fig. 1 or Figs. 6–7 but preferably has no flange 24. The sleeve 17 may have a flange 26 like that shown in Figs. 6 and 7, or it may be omitted, as shown. The diaphragm closes the opening of the passage 32, and for this purpose is clamped against a shoulder 40 in the socket 33 by a guide sleeve or neck member 41 screwed into a screw threaded inner portion of the socket 33. Thus, the diaphragm forms a sealing means for the opening of the passage 32 whereby the compass housing is hermetically closed. This construction is of particular advantage in case of liquid compasses to which the present embodiment is preferably adapted. An operating member formed as a hand wheel or button 42 with a peripheral serrated surface 43 corresponds to the member 7 of Fig. 1 and has a central portion or shaft 44 having a radial slot or recess 45 in which the sleeve 17 is rotatably fitted. The recess 45 may be replaced by a diametrical slot of the same type as that designated with 19 in Figs. 1–3. The button 42 has a circular groove 46 in its inner end surface, and the outer portion of the socket 33 fits slidingly into said groove. A deeper circular cavity 47 extends also in the button 42, and in the bottom thereof are secured retaining means adapted to keep the button 42 in a number of definite axial positions. The retaining means comprises four axially extending resilient arms 48, 49, two arms of the type 48 being located diametrically opposite one another and two arms of the type 49 being likewise located diametrically opposite one another while being displaced by 90° relatively to the first mentioned arms (for the sake of simple illustration only one arm of each type is shown, and the different arms are illustrated as located in diametrically opposite positions instead of being angularly spaced by 90°). The resilient arms 48 cooperate with a groove 50 in the neck member 41 and retain the button 42 once it has been seated in its place, i. e. in an outer axial position, and the resilient arms 49 cooperate alternately with the groove 50 or an inner groove 51 on the neck member separated from groove 50 by a ridge 52, said inner groove being engaged by the arms in a first inner position of the button 42. In the outer position illustrated with full lines in Figs. 8 and 10 a radial end portion 53 of the arms 48 engages a shoulder 54 forming one side of groove 50 and an oblique end portion 55 of the arms 49 engages the outer side of the ridge 52. In the first inner position, the end portion 53 of arms 48 takes an inner position in groove 50, whereas the end portion 55 of arms 49 has passed over ridge 52 and engages the inner groove 51 as indicated with chain-dotted lines. The button may be pushed to a second inner position, since the end portion 55 is able to slide on an oblique surface 41a on the inner portion of neck member 41, while arms 49 are bent outward during spring action.

For the transmission of rotary motion from shaft 10′ or 10″ the mechanism comprises a gear transmission carried by a frame 56. This frame is fitted slidably into the passage 32, a bottom portion 57 thereof engaging an axial notch 58 (Fig. 9) in the above mentioned bridge 35 and a top portion 59 engaging an axial notch 60 in the bottom of the cover projection 34. The frame 56 also has radial portions 61, 62 formed with bearing openings for the shaft 10′ or 10″, which is thus rotatably carried by the frame. Keyed to the shaft 10′ or 10″ is a gear wheel 63, and a substantially V-shaped spring 64 inserted between the radial portion 61 of frame 56 and a shoulder 65 formed in a cavity 66 in the end of the locking lever 39 presses the frame 56 outwards against the gear wheel 63 so that shaft 10′ or 10″ is held with its end or crank arm 14 and the sleeve 17 in engagement with the recess 45 in the operating button 42 by spring action. It is to be noted that lever 39 has a horizontal pivot 67 supported at opposite walls of the compass housing whereby the reaction force deriving from the spring 64 is received. Journalled on a radial pin 68 keyed to the top of the frame 56 by riveting is a gear wheel 69 which meshes with gear wheel 63. A disk 70 having larger diameter than that of the gear wheel 69 is keyed to the hub of the latter. Disk 70 is made from a suitable resilient material such as synthetic rubber or may have teeth at the periphery thereof. Secured to the pin 68, for example by riveting, at one of its ends is a stopping arm 71, which is undulated so as to be yielding to some extent in its longitudinal direction. The stopping arm 71 extends axially inward and has its inner end serrated as at 72. In Fig. 10, the inner end of shaft 10″ extends inside the frame portion 61, and keyed to this inner end is a tubular connecting member 73. Inserted in the inner end of member 73 is a plug 74 having a head 75 of a suitable friction material such as synthetic rubber. The plug may be cemented or secured to the tube by any other suitable means so as to be carried along on rotation of the shaft 10″ and the member 73 keyed thereto. If desired member 73 and plug 74 may be omitted and shaft 10′ be formed with a conical end surface as shown in Fig. 8.

The marching direction indicator as well as the compass card are formed as circular disks 37 and 36 respectively, and suitably are of transparent material. They are held at the top and bottom of a disk carrying the magnetic element which is formed as a rim at the periphery of the disk 76 as shown in Fig. 8 or molded into a rim 77 at the circumference of the disk 76′ as shown in Fig. 10. Passing through center holes in the disks 36, 37 and 76 or 76′ is a flanged bearing member 78 carrying a cap nut 79 at the top thereof. The disks are plane in their initial state but are made from any suitable elastic material, such as a suitable form of artificial resin having elastic memory. The thickness of the rim 77 or the magnet ring 38 is greater than that of the remainder of the disk, and therefore, when the disks are clamped together at the central portions between member 78 and nut 79, the bottom of disk 37 and top of disk 36 will engage the ring 38 or rim 77 by a certain yielding pressure causing a good frictional engagement. The disks 36 and 37 are held rotatably between bearing member 78 and nut 79, but the disk 76 or 76' is held non-rotatably between the disks 36 and 37 since it is keyed to member 78 by a projection 80 extending into a corresponding notch as illustrated in Fig. 8a. Due to this arrangement the disks 36 and 37 may be rotated relatively to the disk 76 or 76' and the magnet against the friction caused by the spring pressure between the marginal portion of the disks.

The bearing member 78 has a conical recess 82 having a jewel bearing 83 at the apex thereof which is adapted to bear on the point of a pivot pin 84 forming the center of the compass in a conventional manner. The inner end of the locking lever 39 has a hole 85 receiving the pivot pin and surrounded by a conical projection 86 which is adapted to engage the conical recess 82 when the lever is swung up to the locking position in which it is shown with dotted lines in Fig. 8. In its locked position the oscillatory unit including the magnetic system is pressed upward against the inside of the cover 31 as shown in full lines in Fig. 8 and in the released position said unit is supported on the point of pivot pin 84. For the present description, however, the lever 39 is shown in its released lower position, though the unit is elevated to its locked position. The outer end of lever 39 has an oblique surface 88 engaged by the displaceable frame 56 at 79, Fig. 10.

The operation of the mechanism described with reference to Figs. 8–10 is as follows:

In the idle position illustrated in full lines, rotation of the button 42 effects rotation of shaft 10' or 10", since the rotational motion is transmitted by the crank arm 14 which rotates in the non-rotatable sleeve 17. The gear wheel 63 rotates and turns the gear wheel 69 and the disk 70, but this has no effect, since the disk 70 is spaced from disk 37. The stopping arm 72 does not take part in the rotation, since it is keyed to pin 68.

If the button is pressed inward to a first inner position against the action of spring 64 the resilient arm 49 snaps over the ridge 52 so that its oblique end 55 will engage the groove 51 as shown in chain-dotted lines in Figs. 8 and 10. In this axial displacement the shaft 10' or 10" is carried along and with it the gear wheel 63 which in turn forces the frame 56 with the pin 68, gear wheel 69 and disk 70 inward, the frame 56 sliding with its bottom portion 57 in the notch 58 of bridge 35 and its top portion 59 in the notch 60 of the cover projection 34.

While moving inward, frame 56 forces the outer end of lever 39 downward, thus elevating the inner end so that projection 86 engages recess 82 and elevates the oscillatory unit against the cover 31.

It is to be noted that the disk 70 now has its periphery radially opposite that of the disk 37, that the stopping arm 71 extends radially opposite the disk 76 or 76' and that the margin of the end surface of the head 75 at the end of the shaft 10" is radially opposite the disk 36. The periphery of disk 37 is shown as plain, but it may have teeth to be engaged by disk 70.

At the end of the axial displacement of the frame the peripheral edge of disk 70 will engage the peripheral surface of the marching direction indicator disk 37, and simultaneously the stopping arm 72 will engage the edge of the magnet disk. It is to be noted that in this position which is indicated with chain-dotted lines in Fig. 10, there is still a small space between the head 75 and the periphery of disk 36. It is now possible to shift the marching direction indicator disk 37 relatively to the magnet disk by a simple rotation of the button 42 in the desired direction. On such rotation the disk 70 is turned and thus rotates disk 37 relatively to its center. The magnet disk is prevented from rotation since it is locked by the stopping arm 71.

Adjustment of the declination of the compass involves a rotation of disk 36 relatively to the magnet disk and this may also be effected by the mechanism described. The button 42 may in fact be moved further inward against the action of spring 64 so that the head 75 engages the peripheral edge of disk 36. For such displacement a rather great pressure must be exerted on the button 42 since a plurality of spring pressures must be overcome, viz. that of the resilient arms 49 which are forced outward sliding on the surface 41a of the neck member 41, that caused by the axial compression of the stopping arm 71 and the resilient disk 70 and further the augmented spring force from the further tensioned spring 64. Therefore, the operator is easily able to feel the difference between the first inner position and the second inner position last described. On rotation of the button in the second inner position the head 75 rotates about the axis of the shaft 10", which is below the plane of the disk 36, so that said disk must be carried along and rotates relatively to the magnet disk, which is still retained by the stopping arm 71.

The elements of the mechanism may be restored to their initial position simply by pulling the button 42 outward, and it is to be noted that the spring 64 assists in such movement.

To secure a correct engagement of arm 71 with the magnet disk, the end of the arm may be shaped substantially as a fork 72' and the periphery of the disk, here indicated at 76"; carrying the magnetic element as a V in radial section, as illustrated in Fig. 10a, thus forming a ridge having oblique sides which are engaged by the shanks of the fork as arm 71 is moved toward the magnet disk.

What I claim is:

1. A mechanism for transmitting motion from one side to the other of a wall, comprising a diaphragm at the place of transmission, a sleeve formed integral with the diaphragm at an open end thereof, said sleeve being closed at the other end, a rotatable member mounted at one side of the diaphragm and having a radial slot engaged by said sleeve, a shaft mounted rotatably inside the diaphragm and having its end bent at an angle relatively to the remainder of the shaft to form a crank arm extending into the sleeve at the open end thereof, the open end portion of the sleeve merging in the diaphragm at an annular zone thereof located in a plane intersecting the axis of the shaft at the point where the shaft is bent.

2. An adjusting mechanism for compasses having a marching direction indicator disk rotatably associated with a magnet disk in a compass housing with a wall passage, comprising a diaphragm closing said passage, an operating button outside the diaphragm, a frame mounted for outward and inward displacement in said passage inside the diaphragm, a shaft carried rotatably by said frame, means to transmit rotary motion from the operating button to the shaft, a gear transmission mounted in said frame to be driven by said shaft, a driving disk operatively connected with the gear transmission, a stopping arm secured to the frame, a lever engaged by the frame to be moved thereby to elevate the marching direction indicator disk and the magnet disk as a unit to a position opposite to the periphery of said driving disk and stopping arm respectively when said driving disk and stopping arm are moved by axial displacement of the button, frame and shaft to engage said marching direction indicator disk and said magnet disk.

3. In a compass having in a sealed compass housing, a marching direction indicator disk and a compass card both rotatable relatively to a magnet disk and associated therewith to constitute an oscillatory unit, an adjusting mechanism comprising a diaphragm closing a passage in the wall of the housing, an operating button mounted outside said wall for rotary and axially displaceable movements relatively to the housing, a frame mounted for outward and inward displacement in said passage inside the diaphragm, a shaft journalled in the frame in axial alignment with the operating button, means to transmit rotary and axial motions from the button to the shaft, a gear transmission mounted in said frame to be driven by the shaft, a stopping arm secured to the frame, a lever pivoted to the compass housing and engaged by the frame to be moved thereby to elevate the oscillatory unit to a position having the marching direction disk opposite the driving disk, the magnet disk opposite the stopping arm and the compass card opposite the inner end of the shaft and means to retain the operating button in an inner position having the driving disk and the stopping arm in engagement with the periphery of the marching indicator disk and the magnet disk, respectively.

4. In a compass as claimed in claim 3, the feature that the stopping arm has a fork-shaped end, and that the periphery of the magnet disk is shaped as a V in radial section.

JOHAN HENRIK L'ABÉE-LUND.

REFERENCES CITED

The following references are of record in the file of this patent:

UNITED STATES PATENTS

| Number | Name | Date |
|---|---|---|
| 599,245 | Merrill | Feb. 15, 1898 |
| 834,082 | Smith | Oct. 23, 1906 |
| 893,184 | Mercer | July 14, 1908 |
| 1,436,444 | Holmes | Nov. 21, 1922 |
| 1,736,974 | King | Nov. 26, 1929 |
| 2,014,024 | Leatherman | Sept. 10, 1935 |
| 2,127,060 | Hansen et al. | Aug. 16, 1938 |
| 2,334,901 | Bullerjahn | Nov. 23, 1943 |
| 2,451,730 | Greenlee | Oct. 19, 1948 |
| 2,454,340 | Reichel | Nov. 23, 1948 |

FOREIGN PATENTS

| Number | Country | Date |
|---|---|---|
| 69,982 | Switzerland | Nov. 18, 1914 |
| 96,752 | Sweden | Sept. 5, 1939 |
| 98,132 | Switzerland | Mar. 1, 1923 |
| 100,764 | Sweden | Jan. 28, 1941 |
| 823,759 | France | Oct. 25, 1937 |
| 825,932 | France | Mar. 17, 1938 |